United States Patent [19]
Shuknecht et al.

[11] Patent Number: 5,694,754
[45] Date of Patent: Dec. 9, 1997

[54] SICKEL BAR CUTTER HAVING AUTOMATICALLY ADJUSTING CUTTER KNIFE HOLD DOWNS

[76] Inventors: Lee N. Shuknecht, 6277 Oak Orchard Rd.; Dale J. Shuknecht, 6456 Oak Orchard Rd., both of Elba, N.Y. 14058

[21] Appl. No.: 627,296

[22] Filed: Apr. 3, 1996

[51] Int. Cl.⁶ .................................................. A01D 55/02
[52] U.S. Cl. ........................................... 56/298; 56/305
[58] Field of Search ...................... 56/DIG. 15, 10.2 R, 56/14.4, 192, 296, 298, 257, 305, 308, 310; 411/348

[56] References Cited

U.S. PATENT DOCUMENTS

| | | | |
|---|---|---|---|
| 1,272,095 | 7/1918 | Rankin | 56/305 |
| 1,383,483 | 7/1921 | Pratt | 56/298 X |
| 3,099,125 | 7/1963 | Turner | 56/298 X |
| 3,298,164 | 1/1967 | Salyards | 56/305 |
| 4,553,380 | 11/1985 | O'Halloran | 56/298 X |
| 4,909,026 | 3/1990 | Molzahn | 56/298 |
| 5,343,682 | 9/1994 | Puncochan | 56/305 |
| 5,431,000 | 7/1995 | Shuknecht | 56/308 |
| 5,487,259 | 1/1996 | Powers et al. | 56/298 |

*Primary Examiner*—Terry Lee Melius
*Assistant Examiner*—Robert Pezzuto

[57] ABSTRACT

A sickle bar cutter assembly for use on crop harvesting machines includes a mechanism for automatically adjusting the relationship of the cutter hold downs to the cutter knives to ensure that proper scissors action of the cutter knives produces a clean cut of the crop being harvested. The mechanism includes a member for biasing the cutter hold downs against the cutter knives and a member to which the cutter hold down is mounted and about which it pivots. At least those portions of the cutter hold downs contacting the cutter knives are hardened.

6 Claims, 4 Drawing Sheets

SICKEL BAR CUTTER HAVING AUTOMATICALLY ADJUSTING CUTTER KNIFE HOLD DOWNS

The invention relates to a sickle bar cutter utilized on machines for harvesting root crops such as beets, onions, etc., and more particularly, to a sickle bar cutter having apparatus for automatically adjusting the tension between the stationary cutter guards and the cutting knives which bear against and are reciprocated along the cutter knife guards.

Typically, in previously known sickle bar cutters, the reciprocating cutter blades were held in place against the cutter knife guards by a hold down clamp which was firmly fastened to a mounting bar. The hold down was fitted with an adjusting mechanism to enable the proper spacing to be achieved between the hold down and the reciprocating cutter blades such that proper shearing of the crops occurs. However, it will be appreciated that frequent adjustments between the hold downs and the reciprocating cutters were necessary as the wearing action caused by the continual back-and-forth movement of the cutter blades against the stationary hold downs tended to wear, and thereby alter, the preset spacing between the two. It was then necessary for the operator of the equipment to manually readjust the spacing to the prescribed acceptable tolerances. This was, and still is, a time consuming and tedious procedure resulting in an unacceptable period of down time for the harvester. Of course, if the adjusting procedure became necessary while crops were being harvested, it could result in the farmer's inability to complete the harvest due to, for example, a change in weather conditions. Additionally, while the equipment is being serviced, the farmer, who in many instances is the person responsible for maintenance, would not be available to perform required other tasks.

An example of a mechanism for adjusting the spacing between the reciprocating cutter knives (also referred to therein as cutters) and the stationary knife guards for a sickle bar cutter utilized on a crop cutter may be seen in U.S. Pat. No. 4,909,026 issued Mar. 20, 1990 to Herbert W. Molzahn et al. Herein, a plurality of adjusting screws are adapted to an adjuting plate. By a time consuming and tedious process, the plurality of adjusting screws are loosened and/or tightened with respect to each other such that the proper spacing between the reciprocating cutters and the stationary guards is achieved. This procedure is time consuming and must be frequently repeated as the spacing changes due to the normal wear caused by the rubbing of the two surfaces.

It is a principal object of the invention to provide an improved sickle bar cutter which requires no adjustments to set the proper spacing between the reciprocating cutters and the stationary guards.

It is a further object of the present invention to provide an improved a sickle bar cutter which automatically adjusts the spacing between the reciprocating cutters and the stationary guards.

It is a still further object of the present invention to provide a knife guard for a sickle bar cutter which may be easily retrofitted to many existing sickle bar cutters without causing undue downtime, either for the apparatus itself or for the person performing the retrofit.

Briefly described, as embodied in a harvester wherein the tops of root crops, such as onions, are sheared by the scissors-like action of reciprocating cutters, the invention comprises a knife, or cutter, hold down which automatically and continually adjusts the spacing between the reciprocating cutters and the stationary guards such that proper and uninterrupted harvesting of crops is accomplished. At least the surfaces of the cutter hold downs contacting the reciprocating cutter knives according to the invention are constructed from a material hardened to approximately 477 on the Brinell scale. The hold downs further include a biasing member, such as a spring, to urge the hold down against the reciprocating cutters. The size of the spring wire is selected to ensure appropriate force is exerted between the hold down and reciprocating cutters to maintain critical spacing therebetween.

The foregoing and other objects, features and advantages of the invention, as well as a presently preferred embodiment thereof and best mode for practicing the invention will become apparent from reading the following description in connection with the accompanying drawings in which.

Figure 1:
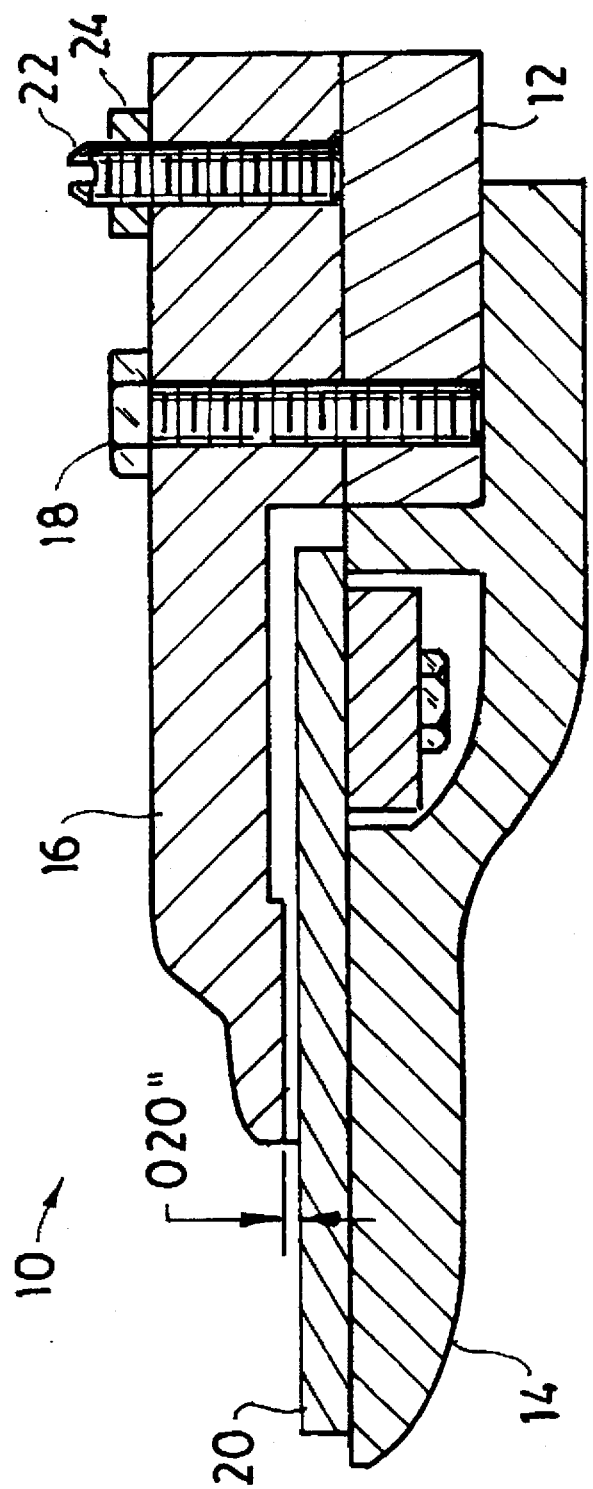
FIG. 1 is a sectional view of a sickle bar cutter according to the Prior Art.

Referring to FIG. 1, a generally well known prior art sickle bar cutter 10 will be seen which includes an elongate mounting bar 12 to which a plurality of knife, or cutter, guards 14 and hold downs 16 are secured by way of a mounting bolt 18. A plurality of knives, or cutters, 20 are adapted to be reciprocally mounted between guards 14 and hold downs 16. A set screw 22 and lock nut 24 are mounted to hold down 16. In order for proper shearing of crops to take place, an optimal distance of 0.020" must be maintained between hold downs 16 and reciprocating cutters 20. As depicted on the typical prior art sickle bar cutter, the optimal 0.020" distance was set by first loosening bolt 18 which, in turn, loosens hold down 16 from bar 12. Set screw 22 is then adjusted against bar 12 until the optimal spacing is achieved between the cutters 20 and hold downs 16. Once this is accomplished, lock nut 24 is secured and bolt 18 re-tightened. It is evident, however, that frequent maintenance will be required to ensure that the optimal spacing doesn't vary between the reciprocating cutters 20 and the stationary hold downs 16. It has been found that if the spacing is allowed to vary beyond acceptable tolerances, the reciprocating cutters 20 will chatter, or jump, resulting in poor shearing of the crop being harvested.

Figure 2:
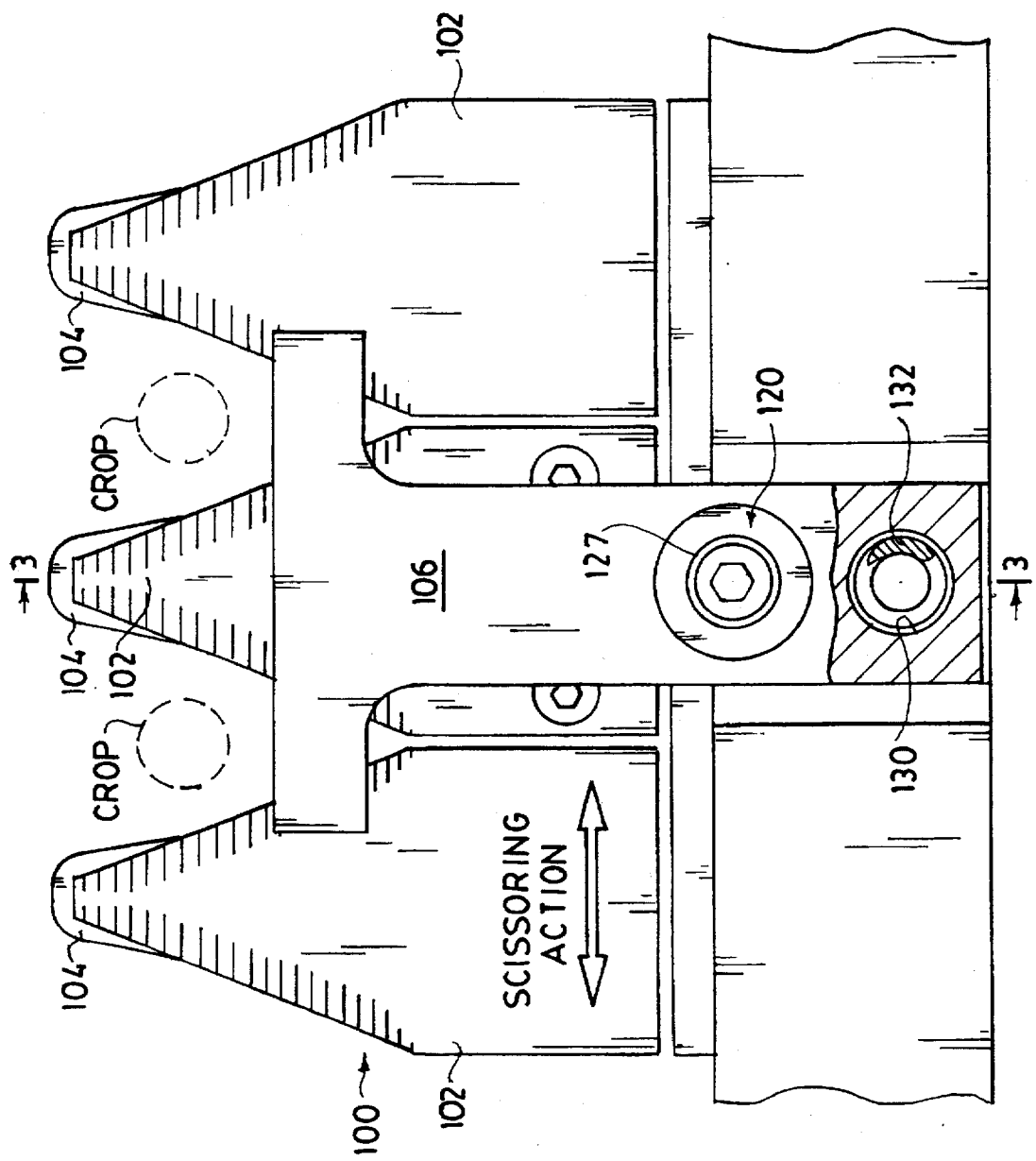
FIG. 2 is a top plan view of a sickle bar cutter according to the invention.
Figure 3:
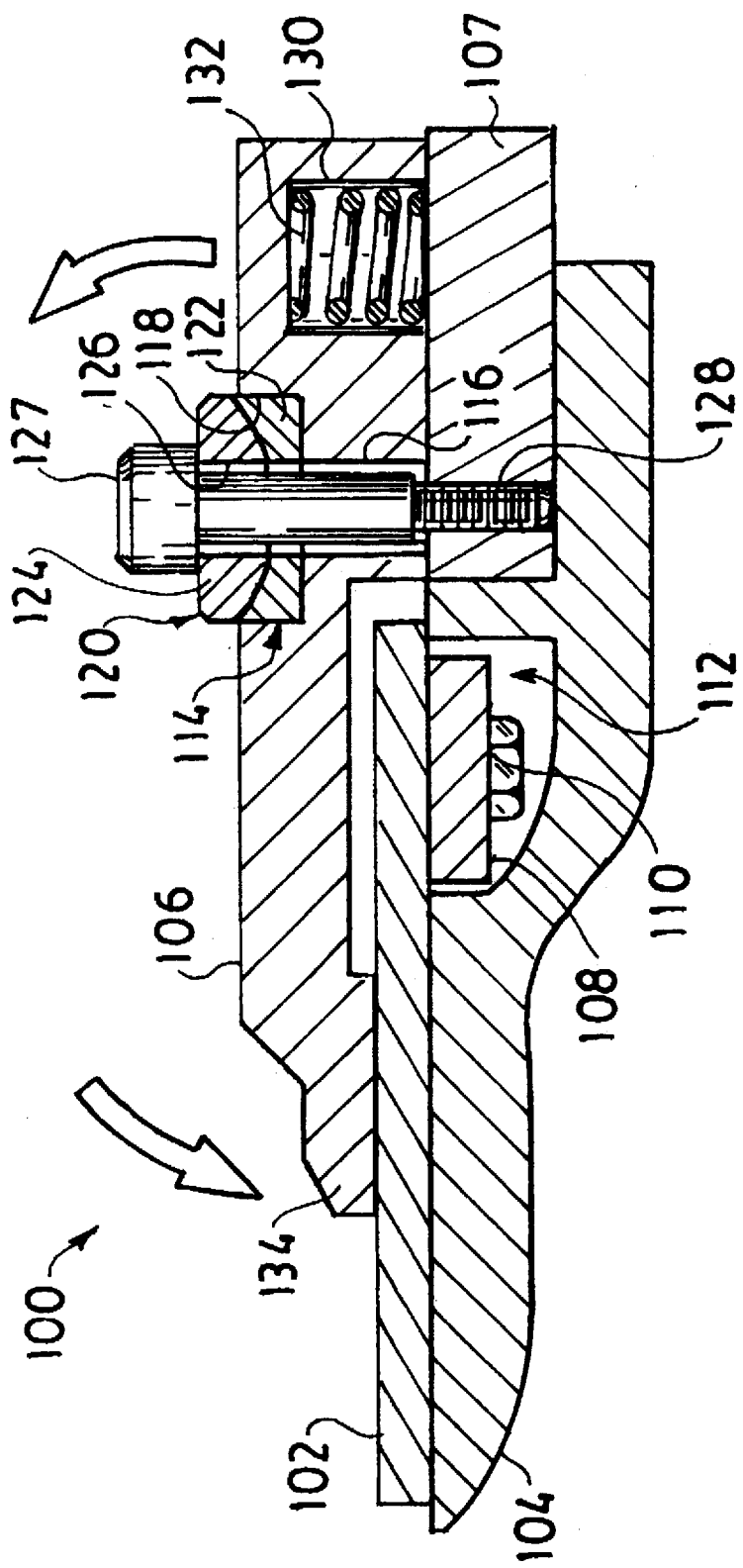
FIG. 3 is a sectional view taken along line 3—3 of FIG. 2
Figure 4:
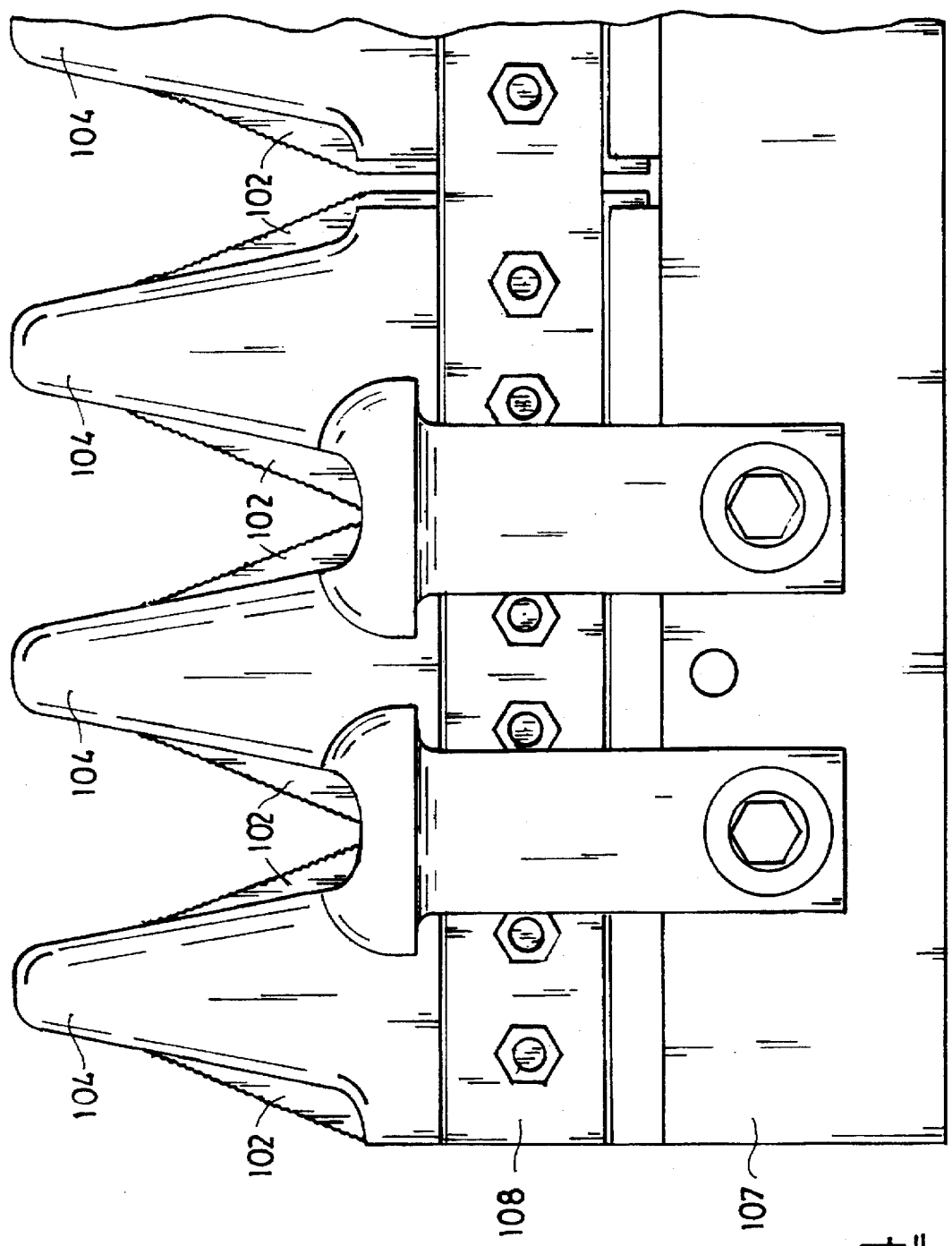
FIG. 4 is a bottom plan view thereof.

A sickle bar cutter with apparatus for automatically adjusting the scissor-like action of the reciprocating cutters is shown in FIGS. 2–4. Herein, a segment of a sickle bar cutter 100 having three cutters 102 is shown, it being understood that a typical sickle bar may comprise many such cutters. Cutters 102 are mounted for reciprocating action between a cutter guard 104 and a hold down 106 which is mounted in a unique fashion (to be fully described hereinafter) to a mounting bar 107. A guide bar 108, best shown in FIG. 3, is mounted to and below cutters 102 by any conventional manner, such as bolt 110. Guide bar 108 is disposed so as to be captured within a longitudinal channel 112 formed in guard 104. Thus, the longitudinal back-and-forth scissoring section of cutters 102 with respect to guards 104 is assured.

As referenced hereinabove, hold down 106 is uniquely fixed to mounting bar 107. Specifically, a counter-bored aperture 114 having a first bore 116 and a second, larger bore 118 is formed in guard 104. A two-piece spherical washer assembly 120 comprising a concave portion 122 mated to a convex portion 124 is received within large bore 118. Two-piece spherical washer 120 includes a bore 126 of approximately the same dimension as bore 116 and is concentric therewith. As illustrated, a shoulder bolt 127 having a diameter smaller than bores 116 and 126 is fitted therethrough and is received within threaded aperture 128 formed in mounting bar 107.

A bottomed hole 130 is formed in guard 106 and is sized to receive and capture one end of a coil spring 132, which has a wire diameter of approximately 0.064" to approximately 0.072" The opposite end of spring 132 bears against mounting bar 107. Thus, it will be seen that coil spring 132 exerts a predictable force between mounting bar 107 and guard 106. At least the portion 134 of hold down 106 which is in contact with cutters 102 is hardened to a Brinell hardness of approximately 477. Alternately, the entire hold down may be formed from a hardened material, such as a T1 steel alloy.

As best seen in FIG.3, spring 120 exerts a force against guard 106 which, in turn, causes hold down 106 to pivot about two-part, concave-convex washer 120 forcing hardened portion 134 into engagement against cutters 102.

In operation, it has been found that the pressure exerted by spring 132 (constructed of a wire diameter, as described) against guard 106 is sufficient to hold the hardened portion 134 thereof in continual engagement against cutters 102 so as to maintain the proper cutting/scissoring relationship between cutters 102 and guards 104. It has also been found that the above-described spring/pivot arrangement of guard 106 exerts a sufficient amount of pressure cutters 102 to keep them from jumping, or chattering which results in poor cutting/scissoring action of the crops being harvested. Further, the pressure delivered by spring 132 is quite adequate to keep guard 106 in continual contact against cutters 102 without causing excessive wear thereto. However, as normal wear does occur to the rubbing surfaces of the cutters 102, spring 132 automatically and continually compensates for same. This results in a sickle bar cutter assembly that requires no maintenance in order to retain tolerances critical to ensure clean shearing of harvested crops.

By comparing the prior art device illustrated in FIG. 1 to the invention depicted in. FIGS. 2–4, it will be appreciated that hold down 16 may be easily modified and converted to resemble cutter hold down 106. That is, hold down 16 may be altered to include bottomed hole 130 which would receive spring 132. Additionally, stepped aperture 114 may be added so as to receive two-piece spherical bearing 120. Therefore, a means is provided to easily convert an old sickle bar cutter to include the unique automatic adjusting device of applicant's present invention.

From the foregoing, it will be appreciated that an improved sickle bar cutter has been provided, and particularly, an improved mechanism for automatically adjusting the tension exerted against the reciprocating cutters by the hold downs of such sickle bar cutters. Many variations and modifications to the apparatus described herein will undoubtedly become apparent to those skilled in the art upon a thorough reading of the present text. Therefore, the foregoing description is meant to be taken as illustrative, and in no way in a limiting sense.

What is claimed is:

1. A sickle bar cutter assembly for a crop harvesting machine, comprising:
   a) a mounting bar;
   b) a plurality of cutter guards mounted to one side of said mounting bar;
   c) a plurality of cutter hold downs mounted to the side of said mounting bar opposite said cutter guards, said cutter hold downs having at least a hardened surface for engaging said reciprocating cutters;
   d) a plurality of cutters mounted for reciprocating movement between said cutter guards and said cutter hold downs, said cutters being in continuous contact with said cutter guards and with said cutter hold downs during said reciprocating movement of said cutters; and
   e) means coupled between said mounting bar and said cutter hold downs for automatically and continually providing pressure from said hardened surface of said cutter hold downs against said cutters to maintain said continuous contact.

2. The sickle bar cutter assembly as set forth in claim 1, wherein said means comprises a biasing member received within an aperture formed in said hold down, and a pivot member coupled to said hold down and said mounting bar, said biasing member exerting a force upon said hold down sufficient to cause same to pivot about said pivot member and to thereby exert a force upon said cutters sufficient to maintain said cutters in contact with said cutter guards.

3. The sickle bar cutter assembly as set forth in claim 2, wherein said biasing member comprises a coil spring.

4. The sickle bar cutter assembly as set forth in claim 3, wherein said coil spring has a wire diameter of approximately 0.064" to approximately 0.072".

5. The sickle bar cutter assembly as set forth in claim 2 wherein said hardened surface of said cutter hold down is hardened to approximately 477 on the Brinell scale.

6. The sickle bar cutter assembly as set forth in claim 2, wherein said pivot member comprises a two piece spherical washer having mating concave and convex portions and a fastener to couple said hold down to said mounting bar to enable said hold down to pivot about said pivot member.

* * * * *